United States Patent Office 3,194,335
Patented July 13, 1965

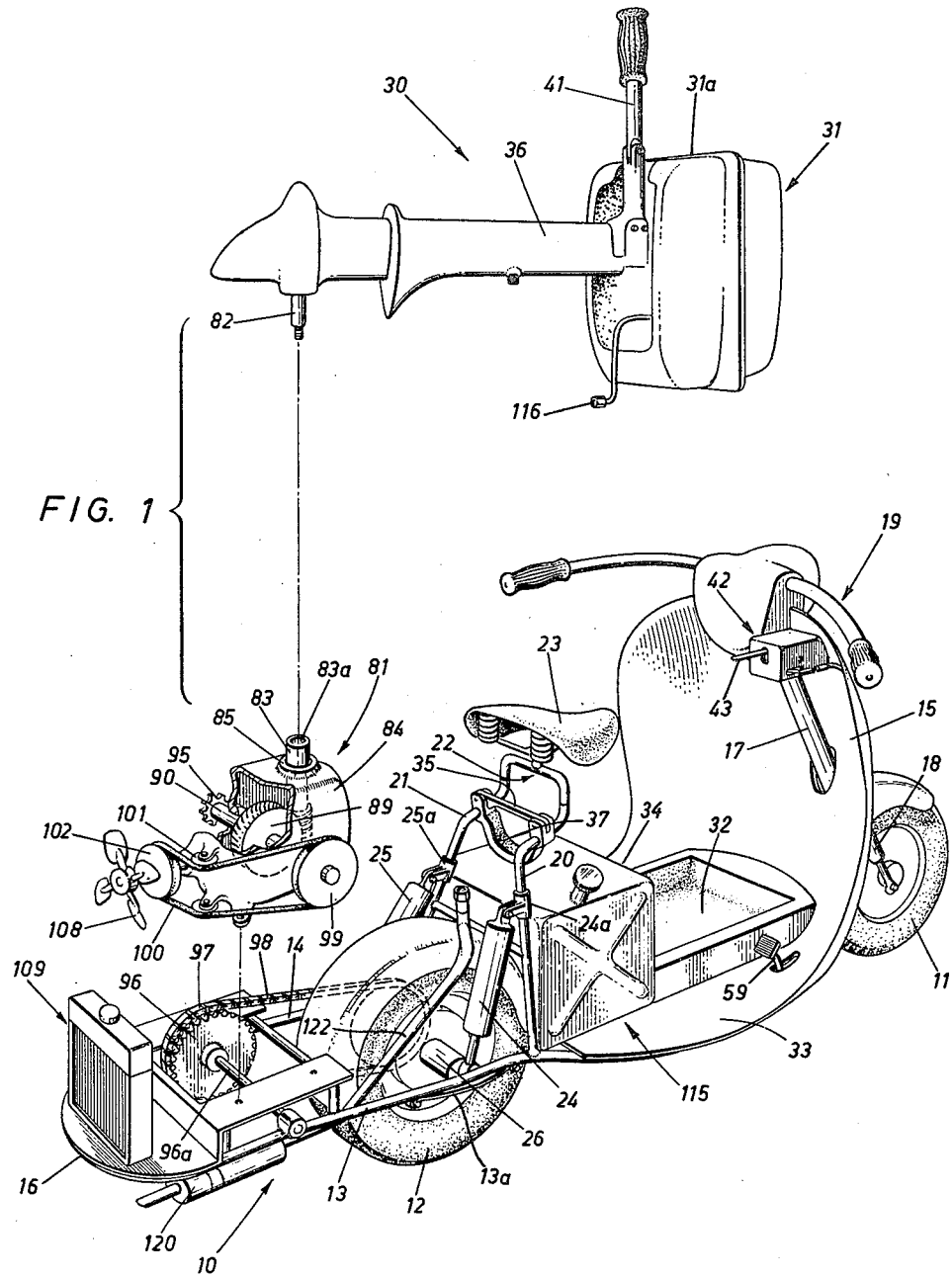

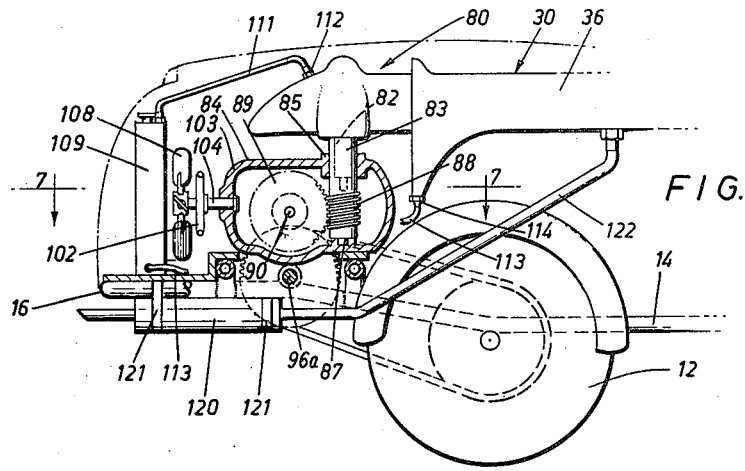
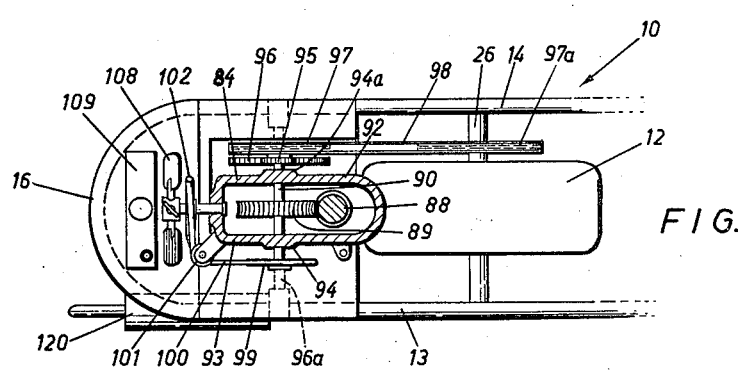
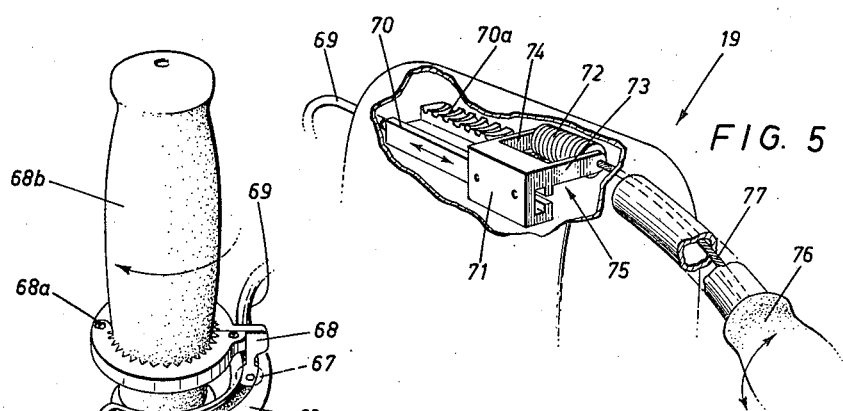

3,194,335
VEHICLE DRIVEN BY OUTBOARD MOTOR
Ronald Yue, alias Yu Chia Lu, 3388 Bathurst St.,
Toronto, Ontario, Canada
Filed Dec. 26, 1962, Ser. No. 246,957
3 Claims. (Cl. 180—33)

This invention relates to motorized vehicles. It is particularly directed to motorized land vehicles such as motor scooters, having a separable power supply in the form of a marine outboard motor.

Conventional motorized land vehicles, such as for example motor scooters, have the prime mover integrally and permanently incorporated with the vehicle frame. Accordingly, the purchaser of a motor vehicle must of necessity incur the expense of purchasing a motor which can be used only for the purpose of propelling said vehicle. In that the prime mover often comprises a major portion of the total vehicle cost, a considerable monetary sum is invested in equipment of limited use.

On the other hand, outboard motors, used as prime movers for marine vehicles such as boats, are of limited use in that said motors can be used only for the propulsion of the boat in a liquid medium. Thus the proprietor of an outboard motor has a considerable investment in a prime mover which can be used for marine travel only.

I have found that marine outboard motors can be adapted to be used in combination with land vehicles to provide an efficient prime mover for land travel. The motors can be quickly and readily modified for either land or marine travel thus limiting the purchaser's investment to one prime mover in place of two; thereby providing important monetary savings while allowing flexibility of use.

Although the following detailed description is made with reference to motor scooters, it will be understood that the description of this embodiment is by way of illustration only and the present invention can be used with land vehicles of the four wheel type in addition to vehicles of the two wheel type.

It is therefore, a principal object of the present invention to provide a vehicle frame and control assembly which is constructed and arranged for receiving a conventional outboard motor for use as a prime mover.

Another important object of the present invention is the provision of a scooter assembly and outboard motor combination which is positive acting, reliable and substantially trouble-free in operation, and which can be quickly and readily assembled as an integrated unit, for land travel or disassembled into component parts.

A further important object of the present invention is the provision of a scooter frame assembly which is adapted to support and house a marine outboard motor for ease of transportation and storage of said motor.

An understanding of the manner in which these and other objects of the present invention can be attained can be had from the following description, reference being made to the accompanying drawing, in which:

FIGURE 1 is an exploded perspective view of a preferred embodiment of the present invention, showing the relationship of the component parts for combination as an integrated unit;

FIGURE 4 is a perspective view illustrating the motor throttle adapter assembly;

FIGURE 5 is a perspective view, partly cut away, of the throttle connector device located in the steering handle;

FIGURE 6 is a side elevation, partly in section, illustrating the connecting mechanism for coupling the propeller shaft to the scooter drive mechanism; and FIGURE 7 is a plan view, partly in section taken along line 7—7 of FIGURE 6.

Like reference characters refer to like parts throughout the description of the drawing.

Figure 3:
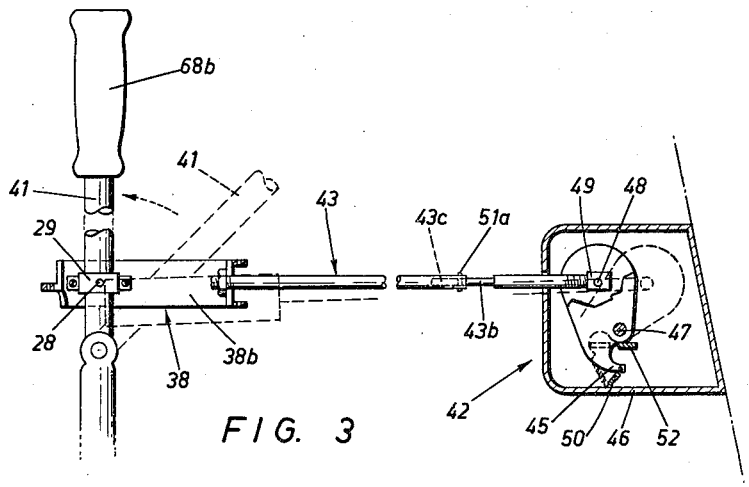
FIGURE 3 is a side elevation, partly in section, of the gear shift connector mechanism.

A preferred embodiment of my invention, as illustrated by the motor scooter and outboard motor combination according to the drawing, comprises a motor scooter frame generally designated by the numeral 10 having front and rear wheels 11 and 12 rotatably mounted thereon. Frame 10 comprises a pair of tubular members 13 and 14 rigidly secured to the lower portion of skirt member 15 at the front and joined by web 16 at the rear. The steering sleeve 17 rigidly connected to the skirt 15 is adapted to house a steering fork 18 which rigidly supports handle-bars 19 at its upper extremity and pivotally supports front wheel 11 at its lower extremity.

A pair of rearwardly inclined tubular members 20 and 21 rigidly connected at their lower extremities by welding or the like means to members 13 and 14 respectively, are connected to each other at their upper extremities by a U-shaped member 22 which is adapted to support seat 23. Member 22 is pivotally connected to the upper extremity of arm 20 and adapted to be latched to the upper extremity of arm 21, thus permitting a quick and facile engagement and disengagement of said U-shaped member from said arms, for reasons which will be explained hereinbelow. A pair of forwardly inclined shock absorbers 24 and 25 are pivotally connected at their upper ends to the upper extremities of arms 20 and 21 by sleeves 24a and 25a and pivotally connected at their lower extremities to rear wheel axle 26 which is rotatably secured to leaf springs 13a.

A marine outboard motor 30 is disposed horizontally over rear wheel 12 such that the head 31 of said outboard is resting in well 32 formed between the floorboards 33 and 34 with control face 31a facing upwardly. A clamp 35 pivotally mounted on the upper extremity of arm 20 is adapted to overlie the leg assembly 36 of the outboard and be rigidly but removably secured to the upper extremity of arm 21 such that said leg assembly can be rigidly secured onto cross-piece 37 disposed immediately below clamp 35.

It will be understood, of course, that the water-cooled marine outboard motor described herein is by way of illustration only; the expression "outboard motor" being intended to include the class of liquid-cooled and air-cooled outboard motors.

Figure 2:
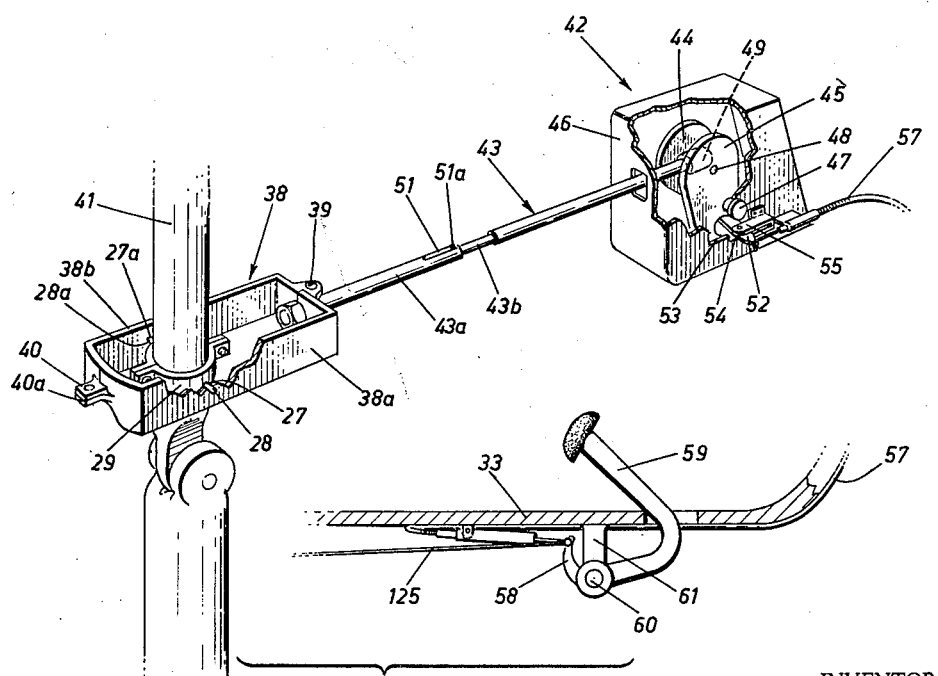
FIGURE 2 is a perspective view, partly cut away, of the gear shift and brake mechanism coupling system.

To adapt the positive forward and neutral positions of the outboard gear shift to the stop and start conditions encountered in land travel and to operatively connect said gear shift and motor throttle to the scooter controls, I have devised novel gear shift and throttle devices as most clearly illustrated by FIGURES 2 and 3. In that the placement of outboard motor controls vary according to the size, model and manufacturer of the motor, it will also be understood that the structure of the controls described herein is by way of illustration only and is subject to modification. In the present embodiment, the gear shift and throttle are combined on arm 41 whereas many outboard motors have independent and separate gear shift and throttle controls. Modifications necessary to conform to design variations will become apparent in view of the following description.

The motor gear shift lever arm 41 is coupled to the scooter controls by a hinged clamp 38 having a pair of arms 38a and 38b connected at one end by hinge 39 and at the opposite end by overlapping lugs 40 and 40a which are adapted to receive a connecting pin therein. A pair of apertures 27 and 27a formed in arms 38a and 38b respectively are adapted to receive axially aligned pins 28 and 28a which are secured to said motor gear shift lever arm 41 by means of collar 29 rigidly secured thereon. Pins 28 and 28a thus provide a pivot point for clamp 38.

Pivotally mounted clamp 38 is connected to the brake-actuated gear shift release mechanism 42 by means of a connecting rod 43. Release mechanism 42 comprises a pair of levers 44 and 45 pivotally mounted within casing 46 by means of a pin 47 extending therethrough. The upper portions of levers 44 and 45 are pivotally secured to one end of rod 43 by means of pin 48 carried by collar 49 which is rigidly secured to said rod. A pair of compression springs 50 secured to the lower ends of levers 44 and 45 are connected to the base of housing 46 as illustrated to bias levers 44 and 45 in one of the two positions illustrated by the solid and broken lines respectively.

In the drawings, the solid lines illustrate the gear shift lever 41 and connecting mechanism in a gear engaging position while the broken lines illustrate the gear shift lever in its neutral position. It will be apparent from the drawing that tension springs 50 will anchor levers 44 and 45 which are connected to lever 41 in one of the above two designated positions because of the off-centre cam shape of said levers and the disposition of said springs. Rearward portion 43a of rod 43 has a slot 51 formed therein to allow axial movement of shank 43b and pin 51a within socket portion 43c of rod 43a, as will be described hereinbelow.

A lever 52 pivotally mounted within opening 53 of housing 46 by means of vertical pin 54 carried by lugs 55 is keyed at its inner end to lever 45 and pivotally connected at its outer end to one end of cable 57. Cable 57 is connected at its opposite end to extension 58 of brake pedal 59 which is pivotally mounted at 60 onto arm 61 which is rigidly secured to member 33.

Referring now to FIGURES 4 and 5, the throttle adapter assembly comprises an arcuate race 62 which is rigidly secured to arm 41 by means of clamp 66 and clamp arm extension 66a. A ball 67 adapted to slide in race 62 is connected to arm 68 which is rigidly secured to clamp 68a which is, in turn, fastened to handle 68b for rotatable travel therewith. A shielded cable 69 is secured at one end to arm extension 68 and secured at its opposite end to member 70 which is slidably mounted for reciprocal movement within the central housing portion 71 of handle-bar 19. Cable 69 is adapted to translate the linear reciprocal movement of member 70 to the rotational movement of motor throttle handle 68b. A lateral extension 70a of member 70 is adapted to be engaged by threaded member 72, which is rotatably supported by arms 73 and 74 of bracket 75, such that rotation of member 72 longitudinally reciprocates member 70. Rotational movement of member 72, and rotation of throttle 68b, is thus controlled by the rotation of hand grip 76 which is connected to member 72 by rigid cable 77.

Referring to FIGURES 1, 6 and 7, the foot assembly 80 of the outboard motor 30 is positioned over gear box 81 of the scooter drive mechanism. Propeller shaft 82 is adapted to be splined into pinion spindle 83 which extends through and is journalled into the upper portion of casing 84 of gear box 81 by means of bearing 85. The lower end 87 of pinion 83 is journalled into a cylindrical recess formed in the interior of the base of casing 84 such that pinion 83 is free to rotate therein. A pinion gear 88 carried by spindle 83 is adapted to engage gear 89 which is splined onto horizontal shaft 90 which is journalled into sidewalls 92 and 93 of gear box 81 by means of bushings 94 and 94a. A pinion gear 95 formed in the exterior extension of shaft 90 is adapted to engage gear wheel 96 which is rotatably carried by shaft 96a which is disposed below shaft 90 and mounted on members 13 and 14. A sprocket wheel 97, mounted on shaft 96a concentric with gear wheel 96, is preferably co-planar with sprocket wheel 97a which is rotatably mounted on rear wheel axle 26. The two sprocket wheels are operatively connected by means of sprocket chain 98 for completing the transmission of power from drive shaft 82 to wheel 12.

A pulley 99 secured to the opposite end of shaft 90 carries a V-belt 100 which passes over idler pulleys 101 for a change of direction such that it engages pulley 102 which is carried by shaft 104 which is journalled into rear wall 103 of casing 84 for rotational movement therein.

A fan propeller 108, secured to the free end of shaft 104, is disposed in proximity to radiator 109 which is rigidly secured to web 16 of the frame chassis. Hose 111 communicates the upper portion of radiator 109 to the coolant inlet 112 of the motor. A second hose 113 communicates the coolant outlet 114 to the lower portion of radiator 109.

A fuel tank 115 mounted between floor-boards 33 and 34 is adapted to supply gas to motor 30 by means of a connecting tube 116 as is well known in the art.

A muffler 120 connected to the underside of web 16 by means of straps 121 is connected to the exhaust outlet of the motor by flexible tubing 122.

To couple the outboard motor with the scooter frame, the motor 30 is disposed horizontally on the frame 10 as illustrated by the drawings such that the control face of the outboard motor is facing upwardly and propeller shaft 82 is seated in the socket 83a of pinion spindle 83 which is adapted to project from the gear box 81. Bracket 35 overlying leg 36 of the motor is locked in position and seat 23 pivoted and locked in position to rigidly secure leg 36 to the scooter frame. Clamp 38 is mounted on lever arm 41 and clamps 66 and 68a are connected to arm 41 and handle 68b respectively. A gas supply tube 116, coolant circulating tubes 111 and 113, and exhaust tube 122 are connected to their respective mountings.

In operation, the outboard motor is started by pulling the conventional starter cord or actuating the electric starting motor, if available, while gear shift lever 41 is in its forward neutral position illustrated by the broken lines. Once the motor is operating properly, lever 41 is pivoted to its vertical position, as indicated by the solid lines, engaging the motor with the scooter drive system for forward movement of the scooter. Hand-grip 76 is rotated to vary the throttle position for controlling the fuel supply to the engine and the scooter speed. To stop the machine, brake pedal 59 is depressed, pivoting it in a clockwise direction about pivot point 60, as shown in FIGURE 2, to advance cable 57 and brake cable 125. As cable 57 is advanced, the protruding portion of lever 52 is advanced causing the lower extremity of levers 44 and 45 to move in a rearward direction to advance rod 43 and lever arm 41. Once lever arm 43 is advanced to its forward position, tension spring 50 holds levers 44 and 45 in position until the scooter operator returns lever arm 41 to its vertical drive position.

If it is desired to disengage the motor drive independently of the brake system, gear shift lever 41 can be pivoted to its neutral forward position with shank 43b being received within socket 43c such that rod 43 is not displaced axially.

The present invention possesses a number of important advantages. The proprietor of an outboard motor can purchase a land vehicle frame such as a scooter frame adapted to receive the motor at a cost substantially below that otherwise incurred in purchasing a scooter equipped with a motor. The outboard motor can be readily installed in the frame to function as a prime mover for land travel or removed from the frame and the propeller inserted and locked in position on the propeller shaft for use as a conventional marine outboard motor.

It will be understood, of course, that modifications can be made in the preferred embodiment of the invention described and illustrated herein without departing from the scope of the invention defined by the appended claims.

What I claim as new and desire to protect by Letters Patent of the United States is:

1. A motor scooter vehicle comprising, in combination, a scooter frame having a pair of wheels rotatably mounted thereon in substantially co-planar alignment and means connected to one of said wheels for steering said scooter for guided land travel, a prime mover of the marine outboard motor type having throttle and gear shift controls, means for removably securing said prime mover substantially in a horizontal position to said frame, power transmitting means secured to said frame for connecting said prime mover to one of said scooter wheels, and means for connecting the outboard motor throttle and gear shift controls to controls carried by the scooter frame.

2. A motor scooter vehicle which comprises a frame, a pair of wheels rotatably mounted on said frame, manually operable steering means connected to one of the wheels for steering the scooter, power transmission means consisting of a gear box assembly secured to the frame and operatively connected to the other wheel for driving said wheel, an outboard motor mounted substantially horizontally on said frame, means for removably securing the outboard motor to the frame such that said outboard motor positively engages the transmission means, and control means carried by said frame adapted to be connected to the outboard motor for controlling the operation of said outboard motor.

3. A motor scooter vehicle which comprises a frame, a pair of wheels rotatably mounted one behind the other on said frame, manually operable means connected to the front wheel for steering the scooter, a prime mover of the marine outboard motor class having a gear shift, throttle and a propeller shaft, power transmission means comprising a gear box assembly rigidly secured to said frame and adapted to receive the propeller shaft and operatively connect said shaft to the rear wheel, connecting means for removably securing the prime mover in a horizontal position to the frame, manually operable control means carried by said frame adapted to be connected to the motor gear shift and throttle controls, and closed circuit coolant circulating means carried by said frame connectable to said prime mover for cooling said prime mover.

References Cited by the Examiner

UNITED STATES PATENTS

| 1,952,091 | 3/34 | Nicholson | 180—30 |
| 2,518,093 | 8/50 | Sutter | 56—25.4 |
| 2,589,793 | 3/52 | Franks | 180—33 X |
| 2,827,714 | 3/58 | Hyde. | |
| 2,891,370 | 6/59 | Musgrave | 180—25 X |
| 2,965,186 | 12/60 | Burns | 180—27 X |

FOREIGN PATENTS

| 412,839 | 7/45 | Italy. |
| 187,427 | 12/55 | Austria. |

A. HARRY LEVY, *Primary Examiner.*